Patented Jan. 30, 1923.

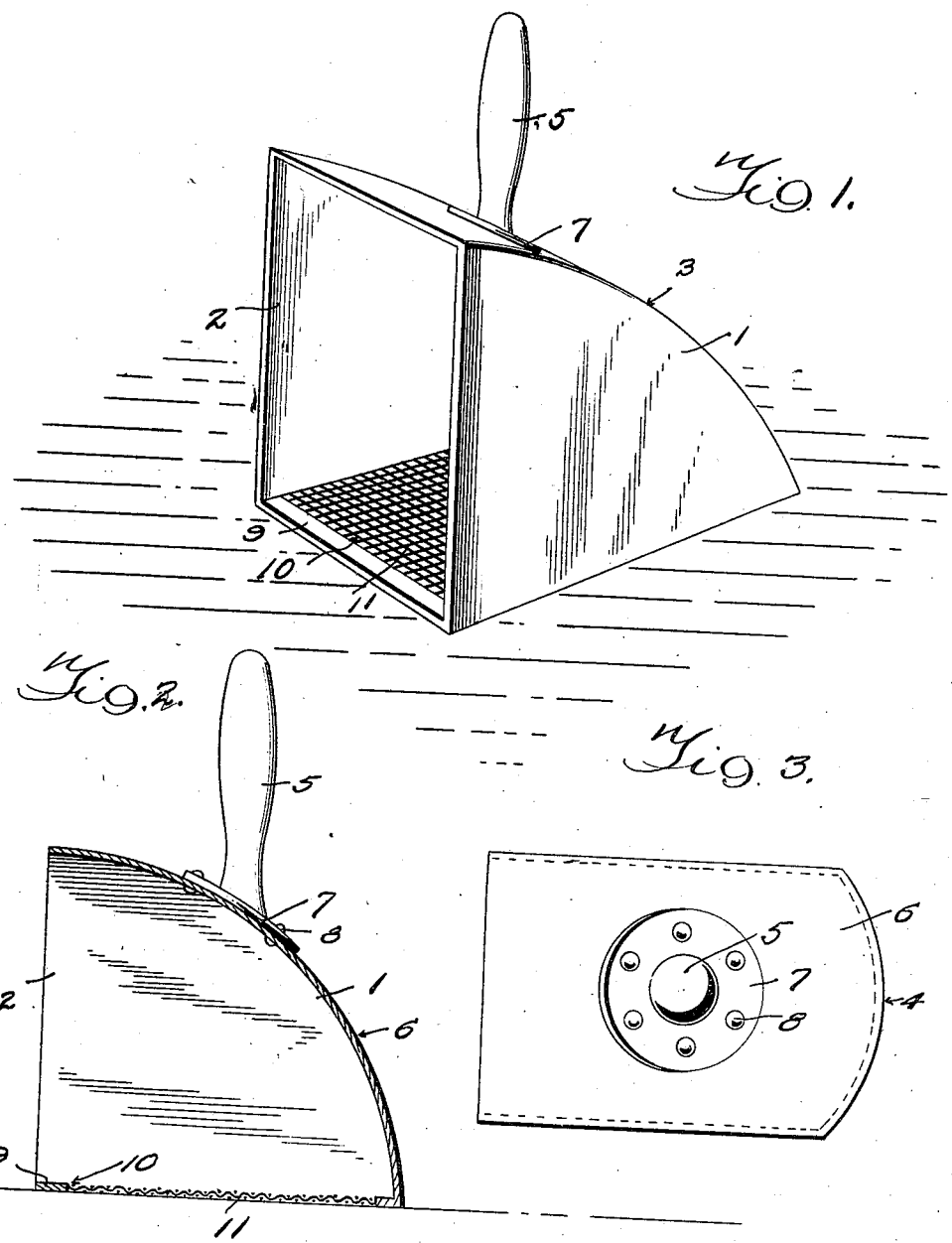

1,443,649

UNITED STATES PATENT OFFICE.

RICHARD D. RODERICK, OF HAZLETON, PENNSYLVANIA.

POTATO MASHER.

Application filed May 19, 1922. Serial No. 562,116.

*To all whom it may concern:*

Be it known that I, RICHARD D. RODERICK, a citizen of the United States, residing at Hazleton, in the county of Luzerne and State of Pennsylvania, have invented certain new and useful Improvements in Potato Mashers, of which the following is a specification.

This invention relates to a potato masher and has for its object the production of a simple and efficient potato masher which is so constructed as to provide a mashing surface at the bottom side thereof for mashing the potatoes and causing the mashed potato to be forced up into the body of the container for the purpose of emptying the same into a dish or other receptacle adapted to receive the mashed potatoes.

Another object of this invention is the production of a simple and efficient potato masher which is so shaped as to conform to the contour of the inner portion of the vessel or container within which the potatoes have been cooked, the shape of the potato masher, facilitating the mashing of the potatoes within the receptacle.

Other objects and advantages of the invention will become apparent during the course of the following description:—

In the drawings:—

Figure 1 is a perspective view of the potato masher,

Figure 2 is a vertical section thereof, and

Figure 3 is a top plan view of the potato masher.

By referring to the drawings it will be seen that 1 designates a receptacle having an open forward end 2, the receptacle having curved upper side edges 3 to produce a scoop like body as clearly illustrated in Fig. 1. The rear end of the body as indicated at 4 is curved to conform to the contour of a circular vessel within which the potatoes may have been cooked, or within which it is desired to mash the potatoes. A handle 5 is secured to the upper curved face 6 of the receptacle 1, and this handle 5 is provided with a circular flange 7, the flange being secured to the upper portion 6 of the the receptacle by suitable rivets 8.

The bottom 9 of the receptacle 1 is provided with an opening 10, which opening 10 is normally closed by means of a suitable screen, or as shown a wire mesh screen 11, the screen 11 being stretched tightly across the opening 10 in the bottom of the receptacle.

From the foregoing description it will be seen that the potato masher may be forced tightly or firmly down upon the potato for mashing, and the mashed potatoes will then be forced through the screen 11 into the body 1 of the potato masher. The mashed potatoes may then be dumped through the open end 2 of the body 1 into a suitable receptacle such as a dish or other receptacle adapted to contain or receive the mashed potatoes.

From the foregoing description it will be seen that a very simple and efficient potato masher has been produced whereby the potatoes may be thoroughly and conveniently mashed and at the same time deposited in the receptacle 1 for the purpose of permitting the mashed potatoes to be conveyed to a proper point where the mashed potatoes may be conveniently dumped into a suitable dish or other receptacle adapted to receive the mashed potatoes.

It should be understood that the detailed changes in mechanical construction may be employed without departing from the spirit of the invention so long as these changes fall within the scope of the appended claims.

What is claimed as new is:—

1. A vegetable masher comprising a hollow body having a reticulated lower mashing face and a laterally disposed outlet for the mashed vegetables.

2. A potato masher of the class described comprising a body having an open lower end, means extending across the open lower end of the body to facilitate the mashing of the potatoes and causing the mashed potatoes to be forced into the body and said body provided with a lateral discharge end for permitting the mashed potatoes to be dumped from the body.

3. A potato masher of the class described comprising a body having an open forward end, and an open lower end, the top of the body being curved to facilitate the dumping of the potatoes from the body, the lower end of the body having a mashing element extending across the lower open end thereof for facilitating the mashing of potatoes and causing the mashed potatoes to be forced up into the body, and said body being provided with a curved rear face to conform to the contour of the receptacle within which the potatoes are placed prior to mashing.

4. A potato masher of the class described comprising a hollow body having a curved upper end, and a curved rear edge to conform to the contour of a suitable receptacle, said body provided with an open discharge forward end, and an open bottom, and a wire mesh screen stretched across the open bottom and constituting a potato mashing element for causing the mashed potatoes to be forced up into the body prior to emptying into a suitable receiving receptacle.

In testimony whereof I affix my signature in pressence of two witnesses.

RICHARD D. RODERICK.

Witnesses:
    John J. Kelley,
    A. D. Roderick.